June 6, 1933.  S. Z. DE FERRANTI  1,913,265
METHOD OF MAKING A METER INDICATOR MECHANISM
Filed Jan. 7, 1930
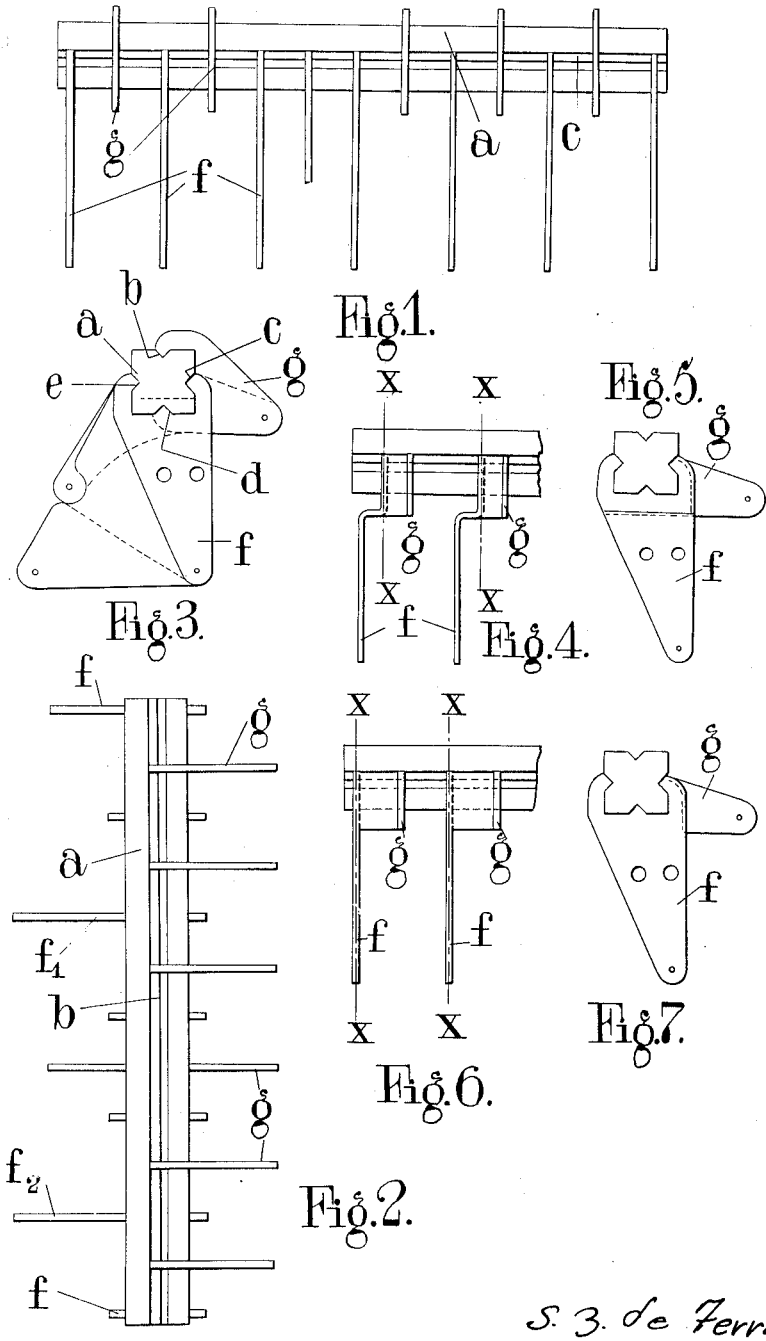

Patented June 6, 1933

1,913,265

UNITED STATES PATENT OFFICE

SEBASTIAN ZIANI DE FERRANTI, OF HOLLINWOOD, ENGLAND, ASSIGNOR TO FERRANTI INC., OF NEW YORK, N. Y.

METHOD OF MAKING A METER INDICATOR MECHANISM

Application filed January 7, 1930, Serial No. 419,165, and in Great Britain January 23, 1929.

This invention relates to meter indicator mechanism of the type embodying a plurality of rollers, the peripheries of which bear suitable numberings representing fractions, units, digits, hundreds, &c., of units of the commodity to be measured by the meter, the rollers being suitably geared together and the whole mechanism being mounted upon a frame.

The invention has for its object to provide improved methods of forming the frame of such mechanism.

Referring to the accompanying diagrammatic drawing:—

Figure 1 illustrates a front view of a meter indicator bar fitted with two sets of supporting plates in accordance with the present invention.

Figure 2 is a plan view, and

Figure 3 is an end view thereof.

Figures 4 and 5 illustrate a modification in front view and end view respectively, and Figures 6 and 7 illustrate similar views of a further modification.

In carrying the invention into effect in one convenient form by way of example as illustrated in the accompanying drawing, I provide a rod $a$ of square cross-sectional area provided with longitudinal V notches $b$, $c$, $d$, $e$. This rod is laterally slotted at intervals for the reception of two sets of supporting plates $f$ and $g$ respectively. Each of these plates is accommodated in one of the slots before mentioned and the forked ends of the plates are clinched over so as to occupy pairs of grooves $b$, $d$ and $c$, $e$ respectively. In order to perform the clinching operation the supporting plates are all placed in position preferably in a former which holds them thus while a tool clinches over simultaneously the two ends of every plate. I prefer also to arrange for the tool to compress the bar so as to deform it in the vicinity of the slots, thus slightly closing the slots upon their respective plates. This may be done as a separate operation or it may be done simultaneously with the clinching operation described above.

The construction formed in the above manner possesses very great rigidity in the required direction while permitting a certain amount of flexibility adequate to enable certain parts to be sprung into position. For example, sufficient flexibility resides in the two plates $f_1$, $f_2$ to enable a spindle to be sprung into position in bearings provided at the free ends of these plates.

In the example described above the plates $g$ serve to support the intermediate pinions while the plates $f$ serve to support pinions employed to gear together the rollers of a meter indicator mechanism.

According to a modification as illustrated in Figures 4 and 5 I provide supporting plates $f$ and $g$ in pairs, each pair comprising a single stamping carried in a slot in the bar $a$ by clinching over the ends and compressing the bar as before.

In the further modification illustrated in Figures 6 and 7 instead of both plates $f$ and $g$ being cranked in relation to the centre line $x/x$ of the supporting slot only the plates $g$ are so cranked.

I claim:

1. A method of constructing a rigid frame for meter indicator mechanism which consists in forming a rigid bar with a plurality of longitudinal grooves and lateral slots, forming a plurality of plates with bifurcated ends, applying the bifurcated ends to said bar so as to straddle it while occupying said slots and clinching the ends of said bifurcations so as to bend them into and spread them within a pair of said longitudinal grooves.

2. A method of constructing a rigid frame for meter indicator mechanism as set forth in claim 1 including the additional step of deforming the bar at positions adjacent the slots therein.

3. A method of constructing a rigid frame for meter indicator mechanism as claimed in claim 1 wherein two sets of supporting plates in integral pairs are mounted in individual slots.

In testimony whereof I have signed my name to this specification.

SEBASTIAN ZIANI DE FERRANTI.